(12) United States Patent
Nekuii et al.

(10) Patent No.: US 11,729,640 B2
(45) Date of Patent: *Aug. 15, 2023

(54) METHODS AND APPARATUS FOR CONFIGURING A FRONT END TO PROCESS MULTIPLE SECTORS WITH MULTIPLE RADIO FREQUENCY FRAMES

(71) Applicant: Marvell Asia Pte, Ltd., Singapore (SG)

(72) Inventors: Mehran Nekuii, San Jose, CA (US); Frank H Worrell, San Jose, CA (US); Hong Jik Kim, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/516,448

(22) Filed: Nov. 1, 2021

(65) Prior Publication Data

US 2022/0060912 A1 Feb. 24, 2022

Related U.S. Application Data

(63) Continuation of application No. 15/398,617, filed on Jan. 4, 2017, now Pat. No. 11,172,379.

(60) Provisional application No. 62/274,709, filed on Jan. 4, 2016.

(51) Int. Cl.
*H04W 24/02* (2009.01)
*H04W 88/08* (2009.01)

(52) U.S. Cl.
CPC .......... *H04W 24/02* (2013.01); *H04W 88/08* (2013.01)

(58) Field of Classification Search
CPC .............................. H04W 24/02; H04W 88/08
See application file for complete search history.

(56) References Cited

U.S. PATENT DOCUMENTS

| | | | | |
|---|---|---|---|---|
| 2009/0245431 | A1* | 10/2009 | Challa | H04L 27/2647 375/340 |
| 2011/0053519 | A1* | 3/2011 | Jarabek | H04W 88/06 455/68 |
| 2014/0064391 | A1* | 3/2014 | Cheng | H04B 7/024 375/267 |
| 2014/0073335 | A1* | 3/2014 | Panchal | H04W 16/14 455/450 |
| 2014/0269322 | A1* | 9/2014 | Li | G06F 9/505 370/236 |
| 2016/0143016 | A1* | 5/2016 | Chanclou | H04W 72/20 370/329 |
| 2016/0197660 | A1* | 7/2016 | O'Keeffe | H04B 17/14 370/329 |
| 2017/0054478 | A1* | 2/2017 | Da Silveira | H04B 1/04 |
| 2017/0063586 | A1* | 3/2017 | Sun | H04L 27/26 |

* cited by examiner

*Primary Examiner* — Yu-Wen Chang
(74) *Attorney, Agent, or Firm* — JW Law Group; James M. Wu (57) ABSTRACT

Methods and apparatus for configuring a front end to process multiple sectors with multiple radio frequency frames. In an exemplary embodiment, a method includes decoding instructions included in a job description list, and configuring one or more processing functions of a transceiver to process a radio signal associated with a selected sector based on the decoded instructions. The configuration of the processing functions is synchronized according to time control instructions included in the job description list.

31 Claims, 7 Drawing Sheets

METHODS AND APPARATUS FOR CONFIGURING A FRONT END TO PROCESS MULTIPLE SECTORS WITH MULTIPLE RADIO FREQUENCY FRAMES

PRIORITY

This patent application is a continuation patent application of a co-pending U.S. patent application having a U.S. patent application Ser. No. 15/398,617, filed on Jan. 4, 2017 in the name of the same inventor and entitled "Methods and Apparatus for Configuring A Front End to Process Multiple Sectors with Multiple Radio Frequency Frames," issued on Nov. 9, 2021 with a U.S. Pat. No. 11,172,379, which further claims the benefit of priority from a U.S. Provisional Application having Application No. 62/274,709, filed on Jan. 4, 2016, entitled "METHOD AND APPARATUS FOR CONFIGURING MULTIPLE SECTORS WITH MULTIPLE RADIO FREQUENCY FRAMES," all of which are hereby incorporated herein by reference in their entirety.

FIELD

The exemplary embodiment(s) of the present invention relates to telecommunications network. More specifically, the exemplary embodiment(s) of the present invention relates to receiving and processing data stream via a communication network.

BACKGROUND

With the rapidly growing trend of mobile and remote data access over high-speed communication networks, such as 3G, 4G, or LTE cellular services, accurately delivering data has become increasingly challenging and difficult. A high-speed communication network that is capable of delivering information includes, but is not limited to, a wireless network, a cellular network, wireless personal area network ("WPAN"), wireless local area network ("WLAN"), wireless metropolitan area network ("MAN"), or the like. While WPAN can be Bluetooth or ZigBee, WLAN may be a Wi-Fi network in accordance with IEEE 802.11 WLAN standards.

To provide wireless communication, a base station in the network typically communicates using various antennas placed across a geographic area to reach user equipment ("UE"). A geographic area is usually divided into multiple sectors wherein each sector may contain (or be serviced by) one or more antennas. The problems associated with managing multiple antennas across multiple sectors with multiple different radio frames can be challenging. For example, Downlink Front End (DLFE) and Uplink Front End (ULFE) systems are used at a base station to process the transmitted and received radio frame data, respectively. However, to configure and operate a DLFE and ULFE to simultaneously support multiple sectors with different radio frame configurations is challenging and can affect the overall performance of the network.

Therefore, it would be desirable to have an efficient way to configure and operate DLFE and ULFE systems to simultaneously support multiple sectors with different radio frame configurations and thereby enhance overall network performance.

SUMMARY

In various exemplary embodiments, methods and apparatus are provided for configuring simultaneous processing of radio frequency ("RF") subframes to/from multiple sectors with multiple different RF configurations. For example, in an exemplary embodiment, after receiving an RF subframe from an antenna via a wireless network, a sector hosting the antenna is identified in accordance with location of the antenna. In one aspect, if the identified sector that sent the symbols of the RF subframe has been initialized to a semi-static condition, at least one of a set of unique front-end accelerator block ("FEAB") instructions is executed to configure and/or update semi-static parameters at the FEAB to correctly process the signals.

In an exemplary embodiment, a method is provided that includes decoding instructions included in a job description list, and configuring one or more processing functions of a transceiver to process a radio signal associated with a selected sector based on the decoded instructions. The configuration of the processing functions is synchronized according to time control instructions included in the job description list.

In an exemplary embodiment, an apparatus is provided that comprises a memory that stores a job description list comprising instructions, and a controller that decodes the instructions and configures one or more processing functions of a transceiver to process a radio signal associated with a selected sector based on the decoded instructions. The configuring of the processing functions is synchronized according to time control instructions included in the job description list.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which should not be taken to limit the invention to the specific embodiments, but are for explanation and understanding only.

DETAILED DESCRIPTION

Various exemplary embodiments are described here in the context of methods and/or apparatus for concurrent processing of data frames carrying multiple different radio frequencies ("RFs") from multiple sectors via a set of antennas.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and business related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of the embodiment(s) of this disclosure.

Various exemplary embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, sub-systems, devices, packet switch elements, packet switches, access switches, routers, networks, modems, base stations, eNB ("eNodeB"), computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network that is able to transmit data in a form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

Figure 1:
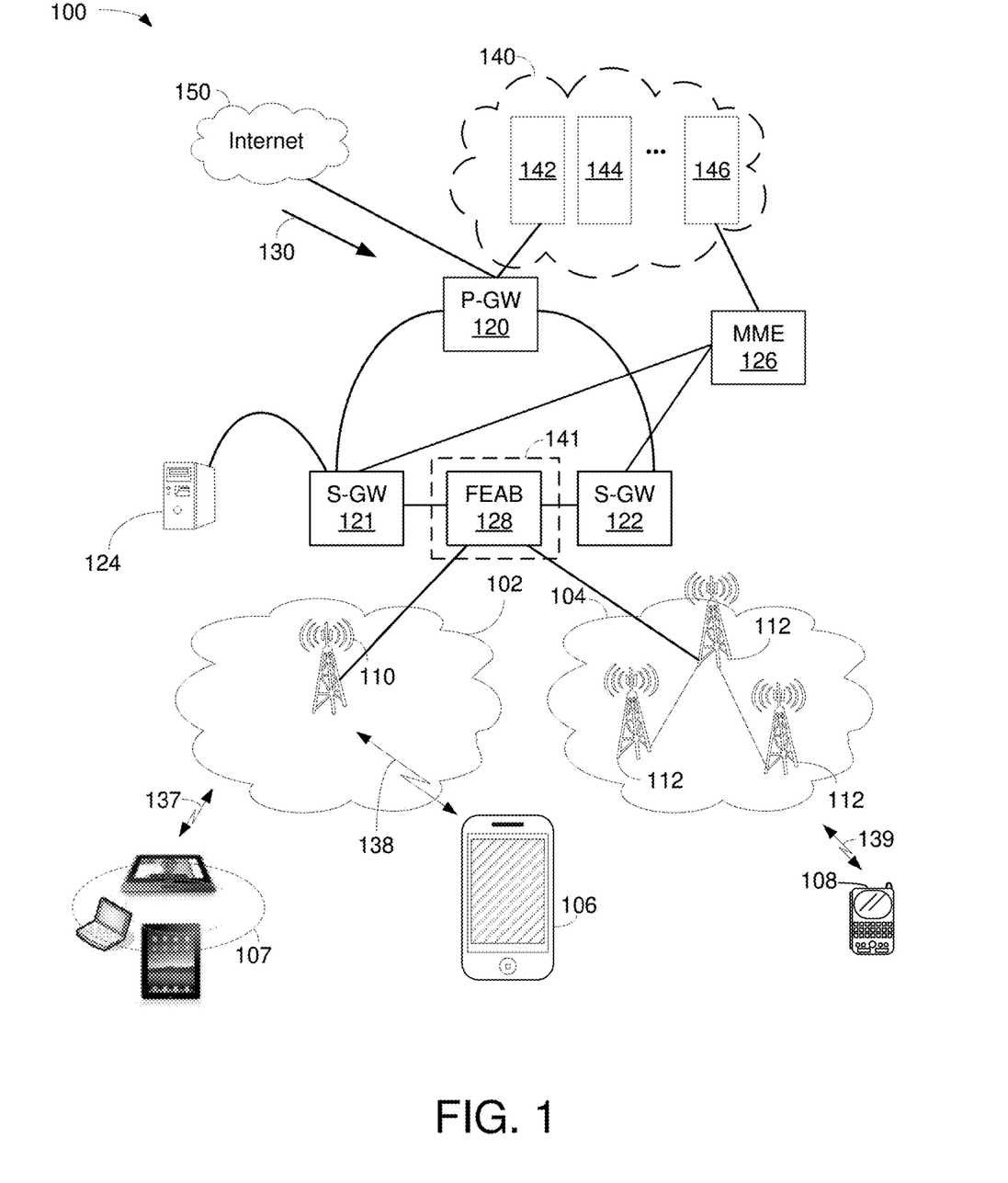
FIG. 1 shows an exemplary block diagram illustrating a communications network configured to process data streams carrying multiple radio frequencies ("RFs") using a front-end accelerator block in accordance with exemplary embodiments of the present invention.

FIG. 1 shows an exemplary block diagram illustrating a communications network 100 configured to process data streams carrying multiple radio frequencies ("RFs") using a front-end accelerator block ("FEAB") in accordance with exemplary embodiments of the present invention. Network 100 includes packet data network gateway ("P-GW") 120, two serving gateways ("S-GWs") 121-122, two cell sites 102-104, server 124, and Internet 150. P-GW 120 includes various components 140 such as billing module 142, subscribing module 144, tracking module 146, and the like to facilitate routing activities between sources and destinations. It should be noted that the underlying concept of the exemplary embodiment(s) of the present invention would not change if one or more blocks (or devices) were added to or removed from network 100.

The network configuration of the network 100 may also be referred to as a third generation ("3G"), 4G, LTE, 5G, or combination of 3G and 4G cellular network configuration. MME 126, in one aspect, is coupled to base stations (or cell site) and S-GWs capable of facilitating data transfer between 3G and LTE (long term evolution) or between 2G and LTE. MME 126 performs various controlling/managing functions, network securities, and resource allocations.

S-GW 121 or 122, in one example, coupled to P-GW 120, MME 126, and base stations 102 or 104, is capable of routing data packets from base station 102, or eNodeB, to P-GW 120 and/or MME 126. A function of S-GW 121 or 122 is to perform an anchoring function for mobility between 3G and 4G equipments. S-GW 122 is also able to perform various network management functions, such as terminating paths, paging idle UEs, storing data, routing information, generating replica, and the like.

P-GW 120, coupled to S-GWs 121-122 and Internet 150, is able to provide network communication between user equipment ("UE") and IP based networks such as Internet 150. P-GW 120 is used for connectivity, packet filtering, inspection, data usage, billing, or PCRF (policy and charging rules function) enforcement, et cetera. P-GW 120 also provides an anchoring function for mobility between 3G and 4G (or LTE) packet core network(s).

Cell sites 102-104 are coupled to a base station comprising FEAB 128, which may also be known as cell site, node B, or eNodeB. Cell sites 102-104 include one or more radio towers 110 or 112. Radio towers 110 and 112 are further coupled to various UEs, such as a cellular phone 106, a handheld device 108, tablets and/or iPad® 107 via wireless communications or channels 137-139. Devices 106-108 can be portable devices or mobile devices, such as iPhone®, BlackBerry®, Android®, and so on. Cell site 102 facilitates network communication between mobile devices such as UEs 106-107 with S-GW 121 via radio towers 110. It should be noted base stations or cell sites can include additional radio towers as well as other land switching circuitry.

A base station 141 can include one or more FEABs 128. In one aspect, mobile devices, such as tablets or iPad® 107, use a first type of RF signals to communicate with radio tower 110 at sector 102 and portable device 108 uses a second type of RF signals to communicate with radio tower 112 at sector 104. After receiving the first and second types of RF signals, FEAB 128 is able to process both RF signals substantially concurrent using a unique set of FEAB instructions. An advantage of using FEAB 128 is to improve efficiency of simultaneous processing of different RF signals received from different antennas or towers at different sectors.

Figure 2:
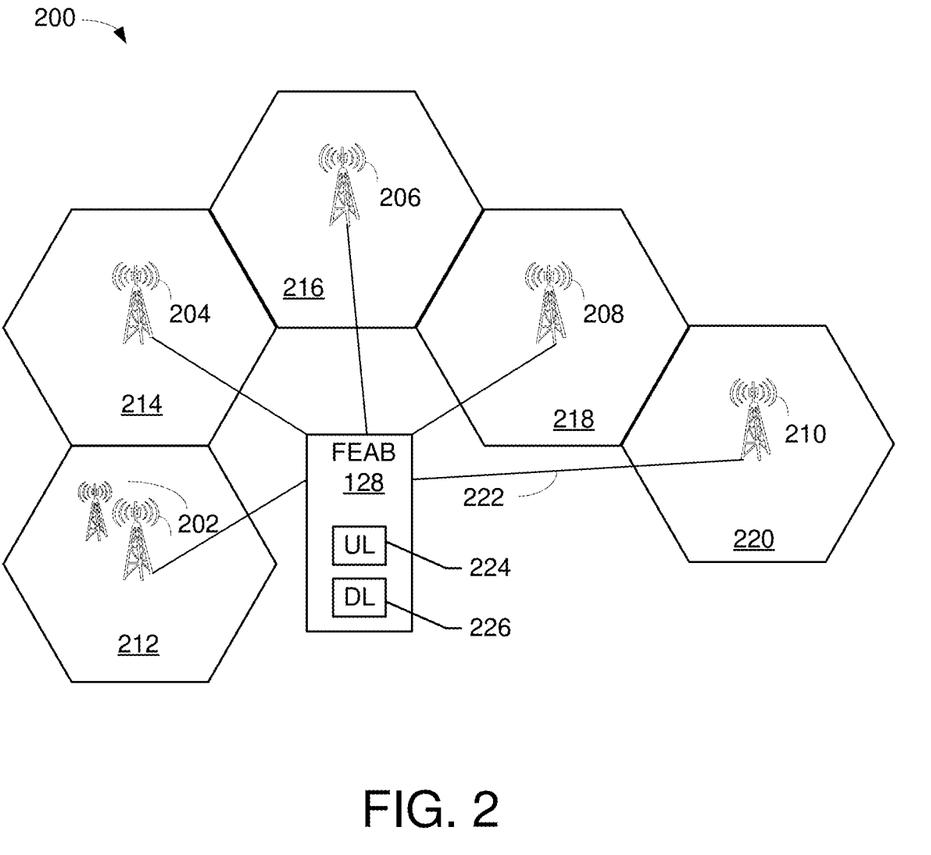
FIG. 2 shows a network configuration that uses an exemplary embodiment of a FEAB to communicate with multiple sectors in accordance with exemplary embodiments of the present invention.

FIG. 2 shows a network configuration 200 that uses an exemplary embodiment of the FEAB 128 to communicate with multiple sectors in accordance with exemplary embodiments of the present invention. The configuration 200 includes multiple sectors 212-220 and FEAB 128 wherein sectors 212-220 are coupled to FEAB 128 via cables 222. In one aspect, cables 222 can be fiber optical cables. Alternatively, cables 222 can be coaxial cables. Sectors 212-220 contain multiple antennas or RF towers 202-210, respectively. In one aspect, each antenna can transmit or receive one specific RF signals. For example, each of sectors 212-220 can transmit and receive at least one specific set of RF signals for carrying information. It should be noted that the novel operation of the exemplary embodiment(s) of the present invention would not change if one or more blocks (or devices) were added to or removed from configuration 200.

In one aspect, FEAB 128 includes a downlink front end (DLFE) 226 and an uplink front end (ULFE) 224. The DLFE 226 and ULFE 224 are used to process the transmitted and received radio frame samples, respectively. To be able to support simultaneous multiple sectors with different radio frame configurations, novel methods and apparatus are provided to configure and run the DLFE 226 and ULFE 224 functions. In an exemplary embodiment, the configurations are performed using a job description list that comprises a series of micro codes that are composed of a set of five (5) instructions (e.g., SFCFG, SSPUP, PSTSK, DTHRD, and WTICK instructions). The SFCFG and SSPUP instructions configure DLFE/ULFE parameters, and the PSTSK instruction configures the DLFE/ULFE for processing one radio symbol per each sector. The DTHRD instruction is similar to the SSPUP instruction and can be used to set up a dummy thread. The WTICK instruction controls the flow of the instructions, allowing the use of real time radio frame ticks to process samples from multiple sectors in the same pipeline but at different time boundaries.

In an exemplary embodiment, the FEAB 128 supports processing of multiple sectors. Each sector could have independent configurations compared to other sectors. For example, each sector can have the following independent configurations.
A. System bandwidth (e.g., 1, 3, 4, 5, 10, 15, or 20 MHz)
B. Number of antennas (e.g., 2, 4 or 8 antennas)
C. Antenna scaling
D. BF and calibration coefficients
E. CDD (cyclic delay diversity)
F. CP (cyclic prefix) type
G. Number of control symbols In an exemplary embodiment, each sector is configured with all the configuration parameters needed and then symbol processing is performed at specific time ticks for each sector. The configuration parameters can be divided into the following categories.
A. Semi-static parameters (e.g., including parameters that may not change every subframe but usually change after several subframes)
B. Per-subframe configurations (e.g., including configurations that can be set at the beginning of each subframe and may change at the start of each subframe)
C. Per-symbol parameters (e.g., including parameters specific to each OFDM symbol that can be set before processing of that symbol)

Figure 3:
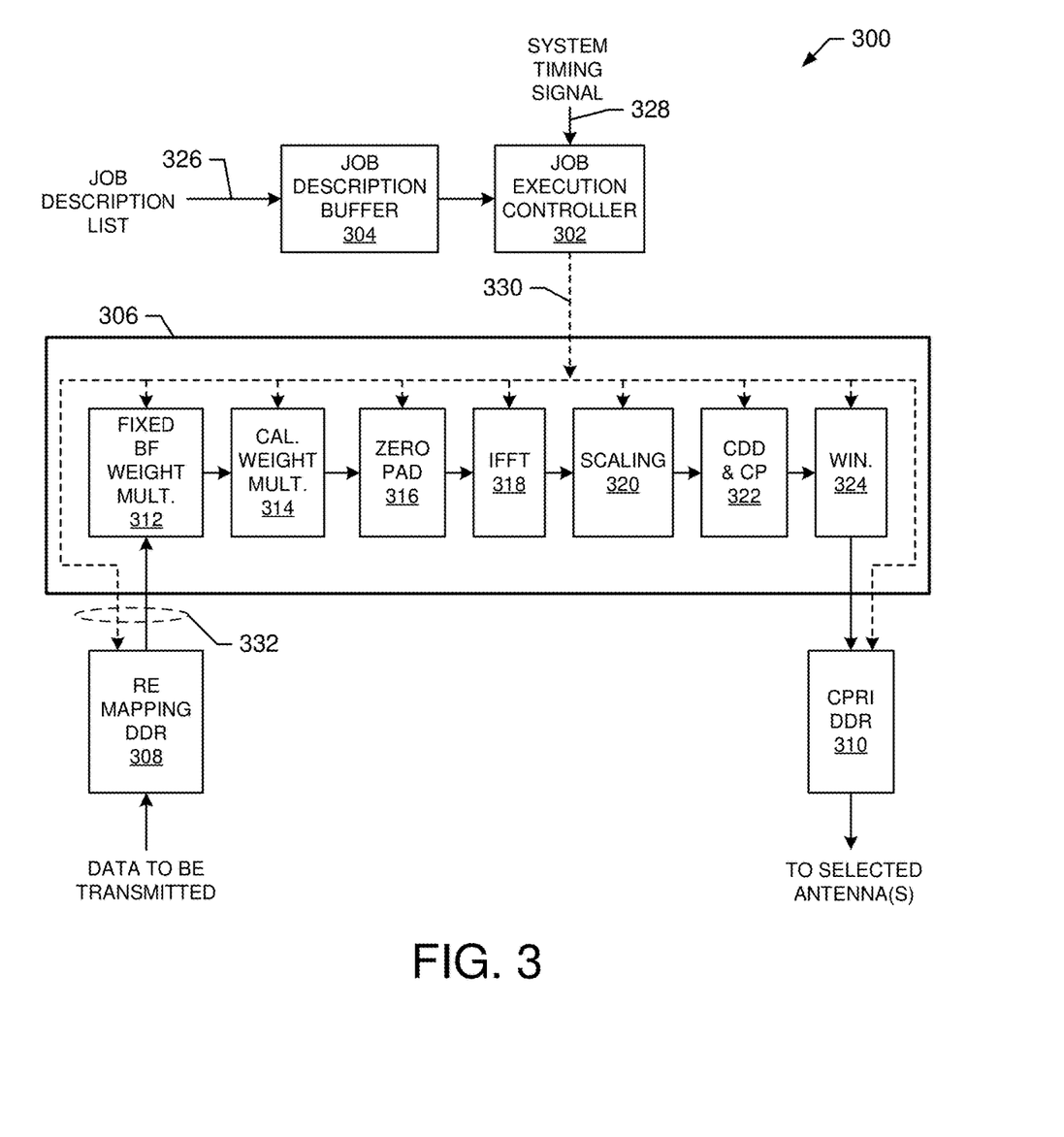
FIG. 3 shows an exemplary embodiment of a downlink architecture for use in a front end.

FIG. 3 shows an exemplary embodiment of a DLFE 300 for use in a FEAB to support processing and transmitting of data to multiple sectors. For example, the DLFE 300 is suitable for use at the DLFE 226 shown in FIG. 2. In an exemplary embodiment, the DLFE 300 comprises a job execution controller 302, job description buffer 304, transmission chain 306, resource element (RE) double data rate (DDR) mapping function 308, and a common public radio interface (CPRI) DDR function 310. In an exemplary embodiment, the mapping function 308 outputs RE data using a direct memory access (DMA) channel 332. In an exemplary embodiment, the buffer 304 comprises any suitable memory, such as ROM, RAM, EEPROM, DRAM or any other type of memory device. In an exemplary embodiment, the controller 302 comprises at least one of a processor, CPU, state machine, micro-controller, memory, interfaces, firmware, discrete logic and/or any suitable hardware to interpret instructions and program configuration parameters into functional blocks of the DLFE 300 using the control bus 330.

In an exemplary embodiment, the DLFE 300 processes radio frame samples that are sent to a particular antenna for transmission using the CPRI 310. In an exemplary embodiment, the main operations of the DLFE 300 include, but are not limited to the following operations.
A. Beamforming (BF) (e.g., provided by block 312)
B. Calibration weight multiplication (e.g., provided by block 314)
C. Zero padding (e.g., provided by block 316)
D. IFFT (e.g., provided by block 318)
D. Signal scaling (e.g., provided by block 320)
E. Cyclic Delay Diversity (CDD) and Cyclic Prefix (CP) addition (e.g., provided by block 322)
F. Windowing (e.g., provided by block 324)

The configuration of DLFE 300 can be performed through a series of micro codes, composed of a set of 5 instructions. Each instruction has 64 bits with the two MSB bits specifying the op-code type. An exemplary embodiment of these instructions is shown below in Table 1. As described in Table 1, the WTICK instruction controls the flow of the instructions, the SFCFG and SSPUP instructions configure FEAB parameters, and the PSTSK instruction configures the FEAB for processing one OFDM symbol per each sector.

The configuration will be programmed into DLFE 300 as a Job Description (JD) list. The initial configuration can be done at cell setup. Before the start of each subframe, a JD list of tasks to be performed and any necessary parameter updates will be applied. These are described in more details in the following sections.

Figure 4:
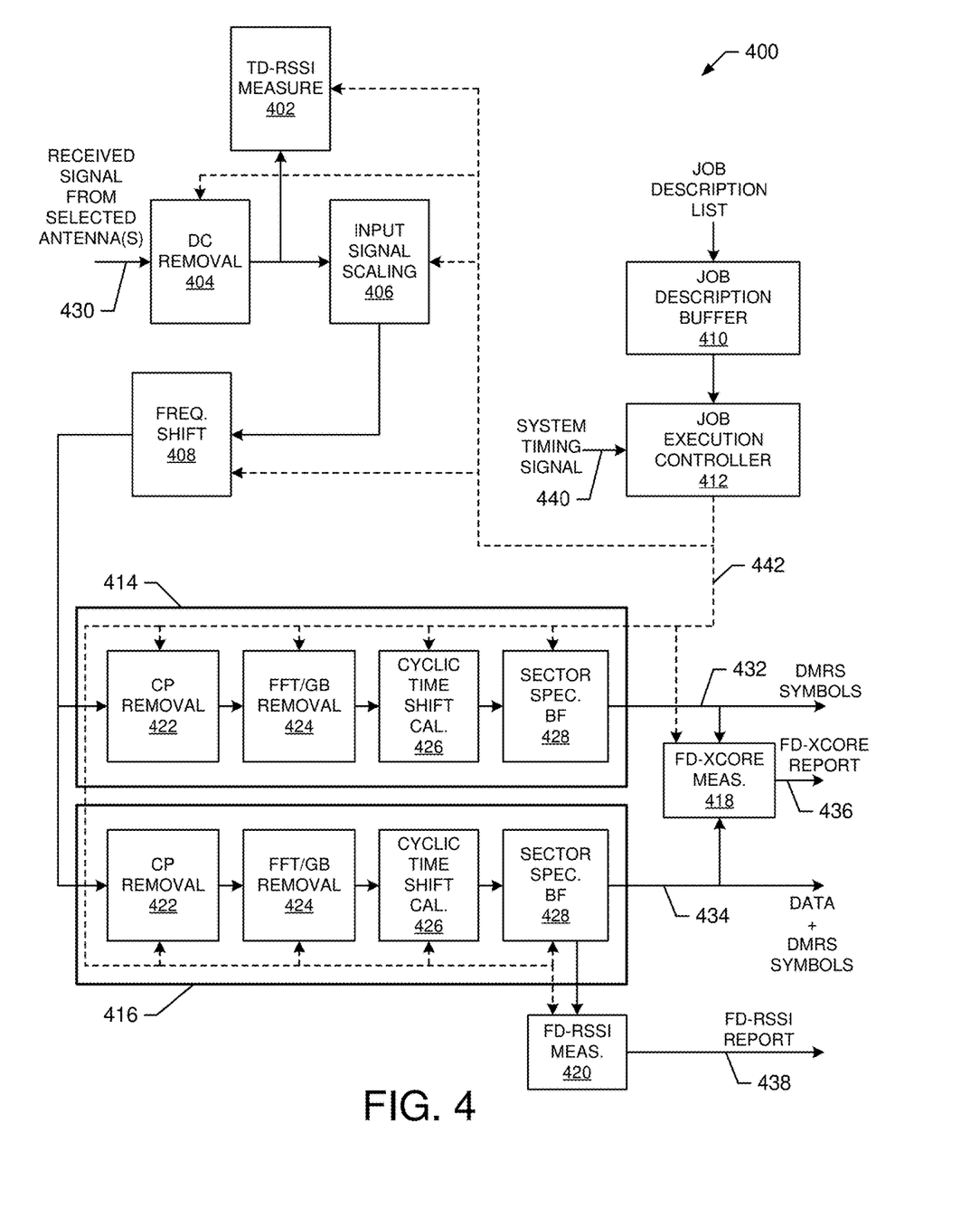
FIG. 4 shows an exemplary embodiment of an uplink architecture for use in a front end.

FIG. 4 shows an exemplary embodiment of a ULFE 400 for use in a FEAB to support processing and transmission of data to multiple sectors. For example, the ULFE 400 is suitable for use at the ULFE 224 shown in FIG. 2. In an exemplary embodiment, the ULFE 400 comprises a job execution controller 412, job description buffer 410, receive chains 414 and 416, and additional functions that are described in more detail below. In an exemplary embodiment, the buffer 410 comprises any suitable memory, such as ROM, RAM, EEPROM, DRAM or any other type of memory device. In an exemplary embodiment, the controller 412 comprises at least one of a processor, CPU, state machine, micro-controller, memory, interfaces, firmware, discrete logic and/or any suitable hardware to interpret instructions and program configuration parameters into functional blocks of the ULFE 400 using the control bus 442. The execution controller 412 receives a system timing signal 440 that can be used to synchronize its operation.

In an exemplary embodiment, the ULFE 400 processes received radio frame samples that are received by a particular antenna. The receive chain 414 outputs DMRS symbols 432 and the receive chain 416 outputs data plus DMRS symbols 434. The frequency domain cross-correlation block 418 outputs report 436. In an exemplary embodiment, the main operations of the ULFE 400 include, but are not limited to the following operations.

A. Beamforming (e.g., provided by block 428)
B. Calibration weight multiplication (e.g., provided by block 426)
C. FFT (e.g., provided by block 424)
D. Signal scaling (e.g., provided by block 406)
E. RSSI measurement (e.g., provided by block 402)
F. Half-tone frequency shift (e.g., provided by block 408)
G. DC component removal (e.g., provided by block 404)
H. CP removal (e.g., provided by block 422)
I. Cyclic time shift (e.g., provided by block 426)
J. Frequency domain cross-correlation (e.g., provided by block 418)
K. Frequency domain RSSI measurements (e.g., provided by block 420)

Table 1 shows an exemplary embodiment of a microcode instruction set having 5 instructions in accordance with the present invention.

TABLE 1

| Instr. | Opcode | Parameters | Description |
|---|---|---|---|
| | Bits [63:62] | Bits [61:0] | |
| WTICK/DONE/NOP | 0b00 | wtick_params | "Wait for Tick" or "DONE" or "NOP" depending on parameters as follows. "DONE": if parameter is set to 0, stops task execution for current subframe (end of execution in current subframe). "NOP": No Operation if the parameter is set to all 1's (0xF...F). "Wait for tick": If the parameter (clk_cnt) is set to a nonzero value, FEAB waits until clock counter is equal or greater than the clk_cnt, and resumes the execution of the next task in the Job Descriptor list. |
| SFCFG | 0b01 | sfcfg_params | "Subframe Configuration" specifies configuration parameters which should be applied at the subframe boundary |
| PSTSK | 0b10 | pstsk_params | "Per Sector per Symbol Task" Processes one OFDM symbol in the specified sector. "pstsk_params" contains task parameters such as: thread_id, port_id, fft_size |
| SSPUP | 0b11 | sspup_params | "Semi-Static Parameters Update" Updates the semi-static parameters. Parameter type and parameter configurations are specified by sspup_params |
| DTHRD | 0b11 | dthrd_params | Dummy thread handling instruction (uses the same opcode as SSPUP instruction, but ss_param_type is always set to '8') |

Semi-Static Parameter Update Instruction

Using this instruction, the Semi-static configuration parameters will be transferred to the FEAB at boot-up. These parameters can also be updated at the beginning of each subframe during normal operation. Depending on the size of the parameters, the update during normal operation happens at least partially at the beginning of each subframe. The Semi-static parameters include, but are not limited to the following.

A. Calibration coefficients
B. BF coefficients
C. Windowing coefficients
D. CDD values
E. Antenna gains
F. Number of antennas per sector The SSPUP instruction is used to configure the semi-static parameters. A description of the op-code parameters for this instruction is shown in Table 2 below.

TABLE 2

| SSPUP parameters | Description |
|---|---|
| thread_id | DMA Thread Identifier |
| port_id | Port Identifier Specifying one of the 3 DMA ports to read |
| block_size | Specifies the block size to read from DMA port as number of 128bit words. For example, this can be "(600/4) Words" if calibration coefficients for a 20 MHz antenna are being updated. |
| param_idx | Specify the parameter index in FEAB memory. |
| ss_param_type | Depending on the value, one of the following parameters is going to be updated by the SSPUP instruction through DMA: '0': bf_coef '1': bf_coef_exp '2': calib_coef |

TABLE 2-continued

| SSPUP parameters | Description |
|---|---|
| | '3': calib_coef_exp '4': win_coef '5': cdd '6': ant_gain '7': sect_ant_map |

Figure 5:
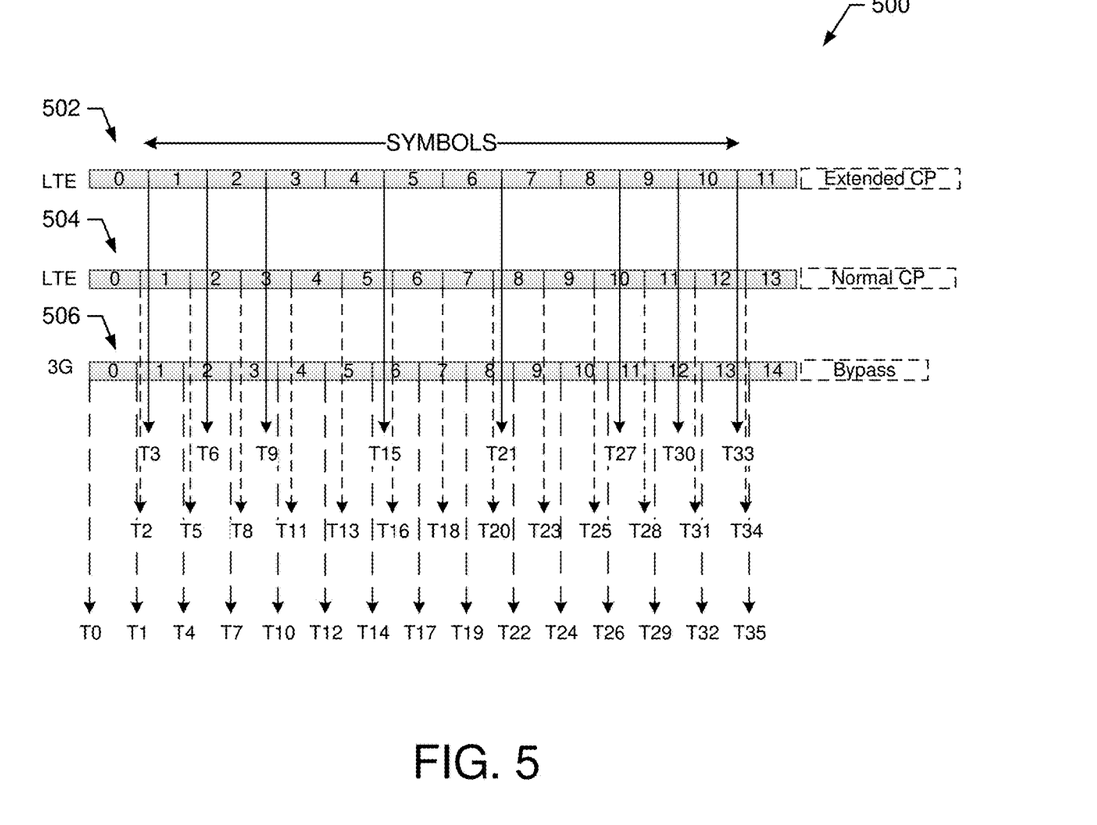
FIG. 5 shows an exemplary timing diagram associated with FEAB in accordance with one embodiment of the present invention.

As explained in Table 2, the "ss_param_type" specifies which semi-static parameter is to be updated. Then, based on the "thread_id" and "port_id", the FEAB will receive "block_size" samples of that parameter from the DMA port specified. Depending on the size of the parameter, a decision to use one or multiple DMAs to transfer the parameters to the FEAB can be made. If multiple DMAs are going to be used, then multiple SSPUP instructions can be programmed to trigger each DMA FIG. 5 illustrates a timing diagram 500 illustrating time synchronization of the configuration of uplink and downlink processing in accordance with one embodiment of the present invention. After the initial configuration update, per-subframe tasks and configurations are specified. These tasks are defined in the JD list. The DLFE and ULFE start executing those instructions at the beginning of each subframe.

In an exemplary embodiment, depending on the configuration (e.g., LTE 502, 504 or 3G 506) subframe type (extended CP, Normal CP or bypass subframe), OFDM symbol lengths would be different. Some timing ticks can be used to mark the start of each OFDM symbol boundary per each subframe type. The tasks to be executed at each time tick are be specified in the JD list.

Diagram 500 illustrates time ticks which are explained below. It should be noted that Ts is defined as the time domain sample duration for 20 MHz subframes, that is (Ts=(1/(15000×2048)) seconds.

A. Extended CP symbol ticks (shown at 502): All extended CP symbols have the same length of $T_E=(512+2048)\times Ts$. Hence, extended CP ticks happen every $T_E$ second.
B. Normal CP symbol ticks (shown at 504): The first symbol of each slot has a length of $T_{N1}=(160+2048)\times Ts$. The rest of the symbols have a length of $T_{N2}=(144+2048)\times Ts$. Symbol ticks will be assigned based on these symbol lengths.
C. Bypass symbol ticks (shown at 506): These symbol ticks are defined based on equal symbol durations of $T_B=2048\times Ts$.

The FEAB has an internal register that counts the number of clocks. Each time tick index should be measured in terms of the number of clock counts (which depends on FEAB clock frequency). The WTICK instruction is used to wait for these time ticks. The bit-map for this instruction op-code is shown in Table 3 below.

E. Bypass any engine if flagged for bypass.
F. Start processing the samples from all antennas in the sector and populating the CPRI input buffer.

The above will be done by individual PSTSK instructions, each corresponding to one OFDM symbol per one sector. The process stops once FEAB reaches a WTICK instruction. It then waits for the next time tick to process the rest of the instructions in the JD list. If clock already passed the time tick given by next WTICK instruction, FEAB continues executing the next instructions.

Figure 6:
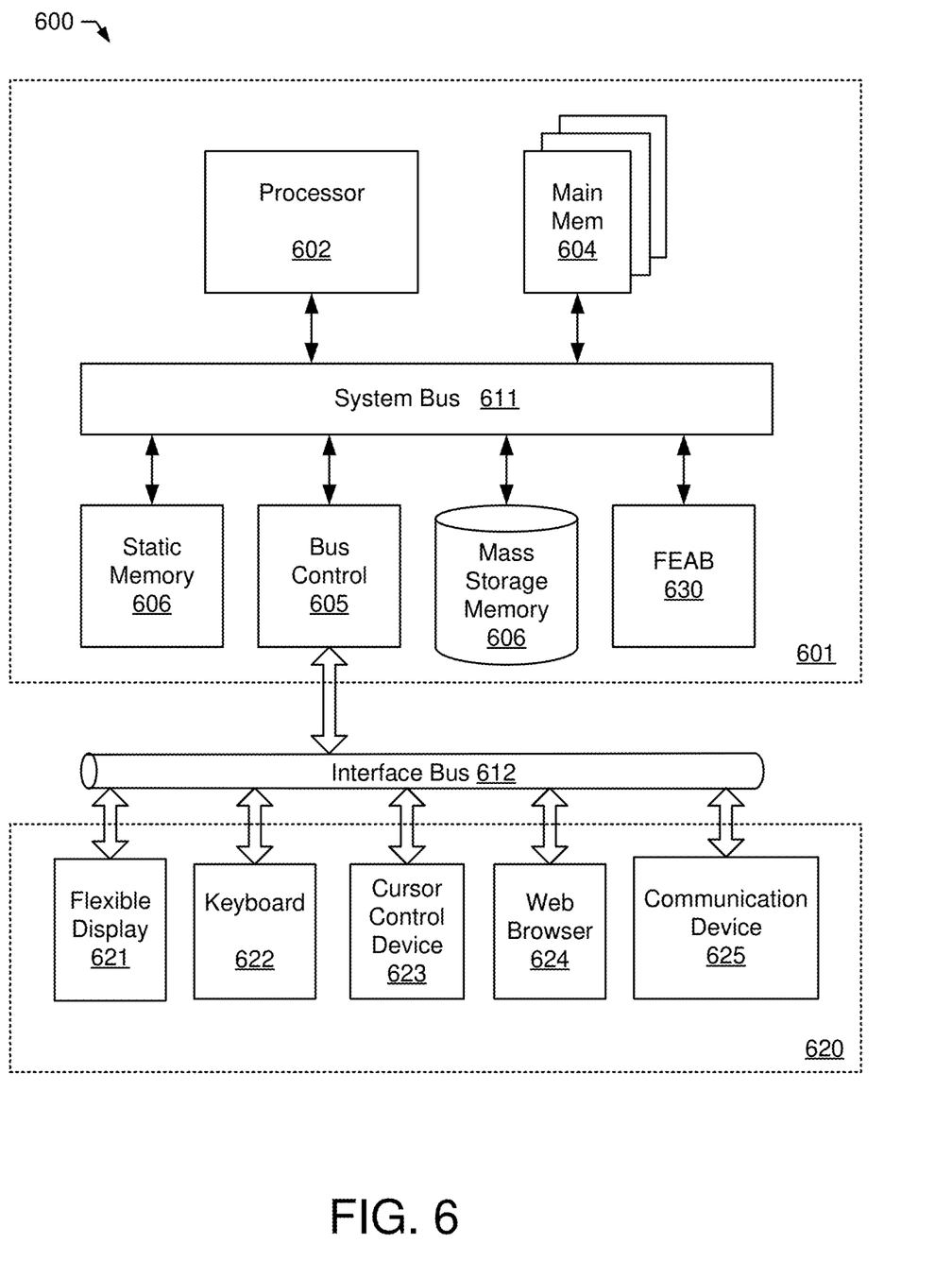
FIG. 6 shows an exemplary embodiment of a front-end system capable of providing a FEAB operation in accordance with one embodiment of the present invention.

FIG. 6 shows a block diagram of a base station 600 comprising an exemplary embodiment of a FEAB 630 in accordance with one embodiment of the present invention. For example, the FEAB 630 is suitable for use as the FEAB 128 shown in FIG. 2. Base station 600 includes a processing unit 601, an interface bus 612, and an input/output ("IO") unit 620. Processing unit 601 includes a processor 602, main memory 604, system bus 611, static memory device 606, bus control unit 605, and mass storage memory 606. Bus 611 is used to transmit information between various components and processor 602 for data processing. Processor 602 may be any of a wide variety of general-purpose processors, embedded processors, or microprocessors such as ARM® embedded processors, Intel® Core™2 Duo, Core™2 Quad, Xeon®, Pentium™ microprocessor, AMD® family processors, MIPS® embedded processors, or Power PC™ microprocessor.

Main memory 604, which may include multiple levels of cache memories, stores frequently used data and instructions. Main memory 604 may be RAM (random access memory), MRAM (magnetic RAM), or flash memory. Static memory 606 may be a ROM (read-only memory), which is coupled to bus 611, for storing static information and/or

TABLE 3

| WTICK | Bit | Width | Ranges | Description |
|---|---|---|---|---|
| clk_cnt | 23:0 | 24 | 0, . . . , K or all 1's | Internal clock count K = floor(SCLK/1000 ) − 1 (SCLK is the max clock count in 1 Sec) |
| reserved | 61:24 | 38 | — | — |
| opcode = 0b00 | 63:62 | 2 | — | WTICK/DONE/NOP instruction identifier If clk_cnt is set to a non-zero value, wait for a tick If clk_cnt is zero, stop task execution If clk_cnt is all 1's (0xFFFFFF), No operation (NOP) |

After executing this instruction, FEAB will wait until "clk_cnt" is equal or greater than internal FEAB clock count register. It then starts to execute the task instructions in the JD list after this. This will prevent any buffer overflow that may happen if FEAB runs any excessive tasks and synchronize FEAB operation to the real time. Note that the clock count register will be initialized to "1" at the beginning of each subframe.

The PSTSK instruction is used to schedule individual tasks that have to be executed at each time tick. These tasks will be executed in the order provided in the JD list.

Most of the per sector per symbol configurations are specified by PSTSK instruction. The FEAB will use these configurations to perform the following operations.
A. Obtaining DMA port and thread ID and the number of samples to read from that port.
B. Adjusting the FFT size for FFT engines.
C. Obtaining antenna indices
D. Adjusting CDD values and CP size instructions. Bus control unit 605 is coupled to buses 611-612 and controls which component, such as main memory 604 or processor 602, can use the bus. Mass storage memory 606 may be a magnetic disk, solid-state drive ("SSD"), optical disk, hard disk drive, floppy disk, CD-ROM, and/or flash memories for storing large amounts of data.

I/O unit 620, in one example, includes a display 621, keyboard 622, cursor control device 623, web browser 624, and communication device 625. Display device 621 may be a liquid crystal device, flat panel monitor, cathode ray tube ("CRT"), touch-screen display, or other suitable display device. Display 621 projects or displays graphical images or windows. Keyboard 622 can be a conventional alphanumeric input device for communicating information between computer system 600 and computer operator(s). Another type of user input device is cursor control device 623, such as a mouse, touch mouse, trackball, or other type of cursor for communicating information between system 600 and user(s).

Communication device 625 is coupled to bus 612 for accessing information from remote computers or servers through wide-area network or wireless network. Communication device 625 may include a modem, a router, or a network interface device, or other similar devices that facilitate communication between base station 600 and the network. In one aspect, communication device 625 is configured to perform different RF signals from different sectors simultaneously. Alternatively, FEAB 630 and communication device 625 are configured to simultaneously perform front end calibration to process multiple sectors with multiple different RF frame configurations in accordance with one embodiment of the present invention. It should be noted that FEAB functions can be carried out by hardware, firmware, and/or a combination of hardware and firmware.

Table 3B shows an exemplary embodiment of a job description task list for use with the DLFE 300. For example, the task list shown in Table 3B can be stored in the job description buffer 304 and processed by the controller 302 to perform calibration coefficient updates in an initialization phase of the DLFE 300 with K antennas.

TABLE 3B

| Offset (Byte) | Task Instruction | # words | Description |
|---|---|---|---|
| 0x00 | SSPUP sect_ant_map | 1 | Sector Antenna Map Update |
| 0x08 | SSPUP bf_coef | 1 | Beam Forming coefficient update |
| 0x10 | SSPUP bf_coef_exp | 1 | Beam Forming coefficient exponent update |
| 0x18 | SSPUP calib_coef_0 | 1 | Calibration coefficient update for Ant0 |
| 0x20 | SSPUP calib_coef_1 | 1 | Calibration coefficient update for Ant1 |
| ... | ... | ... | ... |
| 0x10 + 8*K | SSPUP calib_coef ant(K-1) | 1 | Calibration coefficient update for Ant (K-1) |
| 0x10 + 8*(K + 1) | SSPUP calib_coef_exp | 1 | Calibration coefficient exponent update |
| 0x10 + 8*(K + 2) | SSPUP win_coef | 1 | Windowing coefficient update |
| 0x10 + 8*(K + 3) | SSPUP cdd | 1 | CDD update |
| 0x10 + 8*(K + 4) | SSPUP ant_gain | 1 | Antenna Gain update |
| 0x10 + 8*(K + 5) | DONE (WTICK 0) | 1 | End of task execution in this job |

Table 4 shows an exemplary embodiment of a job description task list for use with the DLFE 300. For example, the task list shown in Table 4 can be stored in the job description buffer 304 and processed by the controller 302 to perform configuration updates in a DLFE system having 2 sectors and with both sectors having Normal CP subframes. The WTICK instructions are shown in bold for clarity and to emphasize how synchronization of the configuration process occurs.

TABLE 4

| Offset (Byte) | Task Instruction | # words | Description |
|---|---|---|---|
| 0x00 | SSPUP sspup_params0 | 1 | Semi-static parameter update at the beginning of JD |
| 0x08 | WTICK T0 | 1 | Wait for tick index T0 |
| 0x10 | DTHRD port 0 | 1 | Dummy thread on port 0 |
| 0x18 | PSTSK sect0sym0 | 1 | Process symbols 0 from sector 0 |
| 0x20 | PSTSK sect1sym0 | 1 | Process symbols 0 from sector 1 |
| 0x28 | WTICK T2 | 1 | Wait for tick index T2 |
| 0x30 | DTHRD port 0 | 1 | Dummy thread on port 0 |
| 0x38 | PSTSK sect0sym1 | 1 | Process symbols 1 from sector 0 |
| 0x40 | PSTSK sect1sym1 | 1 | Process symbols 1 from sector 1 |
| 0x48 | WTICK T5 | 1 | Wait for tick index T5 |
| 0x50 | ... (until scheduling tasks for last symbol tick) | | |
| 0xYY | DONE (WTICK 0) | 1 | End of task execution in this job |

Table 5 shows an exemplary embodiment of a job description task list for use with the ULFE 400. For example, the task list shown in Table 5 can be stored in the job description buffer 410 and processed by the controller 412 to perform calibration coefficient updates in an initialization phase of the ULFE 400.

TABLE 5

| Offset (Byte) | Task Instruction | # words | Description |
|---|---|---|---|
| 0x00 | SSPUP calib_coef_0 | 1 | Calibration coefficient update for Ant0 |
| 0x08 | SSPUP calib_coef_1 | 1 | Calibration coefficient update for Ant1 |
| ... | ... | | |
| 0x08*K | SSPUP calib_coef_K | 1 | Calibration coefficient update for AntK |
| 0x08*(K + 1) | SSPUP calib_coef_exp | 1 | Calibration coefficient exponent update for all antenna streams |
| 0x08*(K + 2) | SSPUP bf_coef | 1 | Beamformer coefficient update for all sectors |
| 0x08*(K + 3) | SSPUP bf_coef_exp | 1 | Beamformer coefficient exponent update for all sectors |
| 0x08*(K + 4) | SSPUP sect_ant_map | 1 | Sector-to-antenna map information update |
| 0x08*(K + 5) | DONE (WTICK 0) | 1 | End of task execution in this job |

Table 6 shows an exemplary embodiment of a job description task list for use with the ULFE 400. For example, the task list shown in Table 6 can be stored in the job description buffer 410 and processed by the controller 412 to perform configuration updates in an ULFE system having 2 sectors and with both sectors having Normal CP subframes. The WTICK instructions are shown in bold for clarity and to emphasize how synchronization of the configuration process occurs.

TABLE 6

| Offset (Byte) | Task Instruction | # words | Description |
| --- | --- | --- | --- |
| 0x00 | SSPUP calib_coef0 | 1 | Calibration coefficient update for logical antenna 0 at the beginning of JD |
| 0x08 | SSPUP calib_coef_exp | 1 | Calibration coefficient exponent update |
| 0x10 | SFCFG sfcfg_params_ant0 | 3 | Subframe configuration parameter update for ant 0 |
| 0x28 | SFCFG sfcfg_params_ant1 | 3 | Subframe configuration parameter update for ant 1 |
| 0x40 | SFCFG sfcfg_params_ant2 | 3 | Subframe configuration parameter update for ant 2 |
| ... | ... | ... | ... |
| 0xXX | SFCFG sfcfg_params_antn | 1 | Subframe configuration parameter update for ant n |
| 0xXX + 0x08 | WTICK T2 | 1 | Wait for clock tick T2 |
| 0xXX + 0x10 | PSTSK sect0sym0 | 1 | Process symbols 0 from sector 0 |
| 0xXX + 0x18 | PSTSK sect1sym0 | 1 | Process symbols 0 from sector 1 |
| 0xXX + 0x20 | WTICK T5 | 1 | Wait for clock tick T5 |
| 0xXX + 0x28 | PSTSK sect0sym1 | 1 | Process symbols 1 from sector 0 |
| 0xXX + 0x30 | PSTSK sect1sym1 | 1 | Process symbols 1 from sector 1 |
| 0xXX + 0x38 | WTICK T8 | 1 | Wait for clock tick T8 |
| ... | ... | ... | ... |
| 0xYY | DONE (WTICK 0) | 1 | End of task execution in this job |

Figure 7:
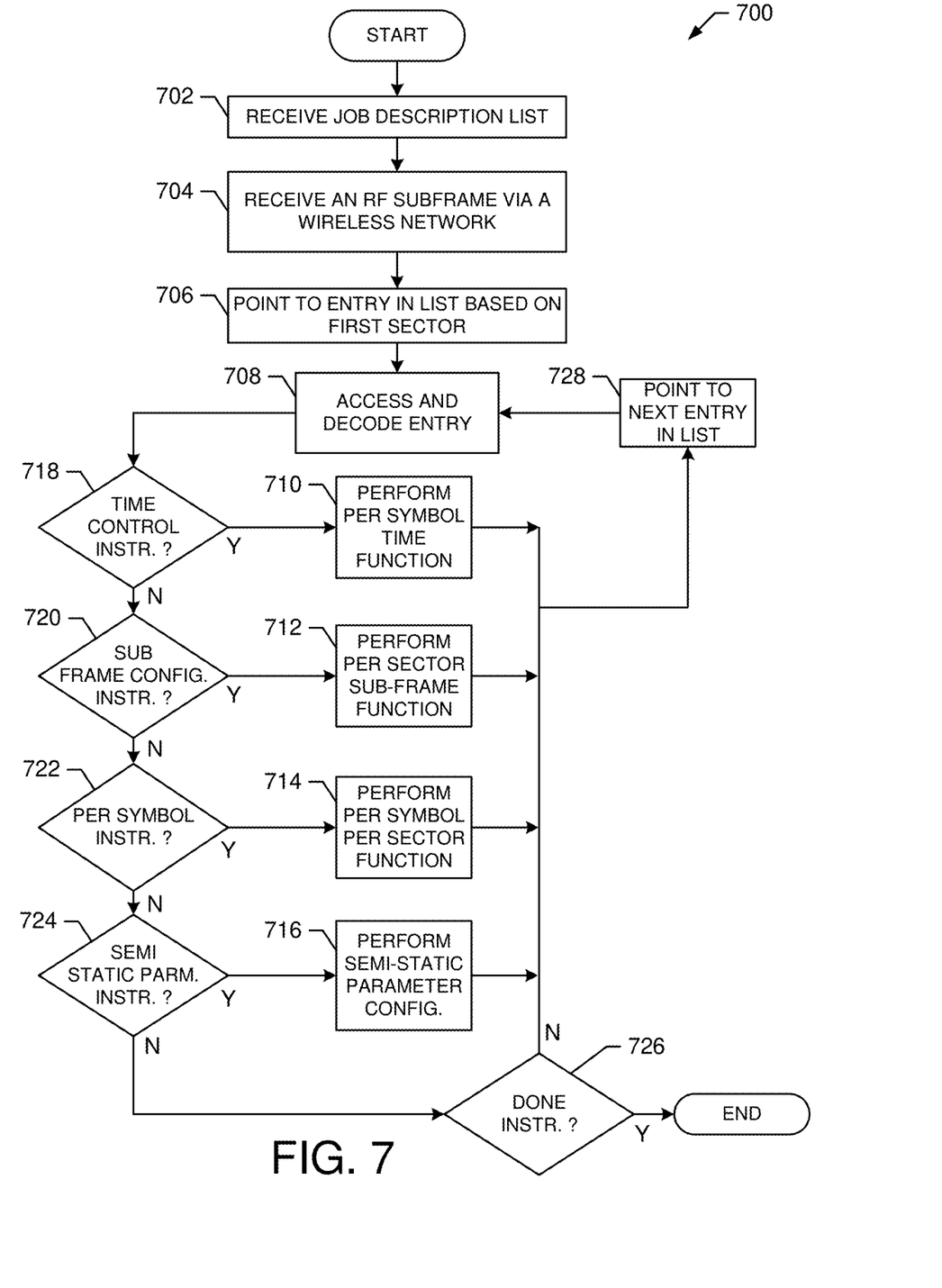
FIG. 7 shows an exemplary embodiment of a method for configuring a FEAB in accordance with exemplary embodiments of the present invention.

FIG. 7 shows an exemplary embodiment of a method 700 for configuring a front end having uplink and downlink processing in accordance with one embodiment of the present invention. For example, the method 700 is suitable for use configuring the downlink 300 and uplink 400. In the description below, the method is used to configure an ULFE, such as the ULFE 400, to receive and process transmissions from multiple sectors having multiple radio transmission frames. However, corresponding operations can also be performed to configure a DLFE, such as the DLFE 300, to process and transmit signals for multiple sectors having multiple radio transmission frames.

At block 702, a job description list is received. In an exemplary embodiment, the job description is received at the job description buffer 410.

At block 704, a process capable of receiving information is able to receive a first radio frequency ("RF") subframe from a first antenna via a wireless network. The process identifies a first sector hosting the first antenna in accordance with location of the first antenna. In one aspect, the first sector contains multiple antennas having a range from one to eight antennas. In another aspect, the different antennas in the first sector may use different RF signals for carrying information. In one example, an RF frame includes multiple RF subframes wherein each subframe carries one or more symbols of data. Each symbol, in one example, represents multiple bits of information. In an exemplary embodiment, the received RF signal 430 for the designated sector/antenna is received at the DC removal block 404.

At block 706, an entry in the job description list is pointed to that is based on the current first sector associated with the received data. In an exemplary embodiment, the controller 412 accesses the buffer 410 to point to the appropriate entry in the job description list.

At block 708, the entry being pointed to is accessed and decoded. For example, the entry may be the beginning of a set of entries that configure a set of processing functions in the receive chains 414 and/or 416. For example, the controller 412 may execute a semi-static parameters update ("SSPUP") instruction to configure the receive chains 414 and/or 416 with a first set of configuration parameters. Alternatively, the controller 412 may execute a per-sector-per-symbol-task ("PSTSK") instruction to update a second set of configuration parameters. Also, the controller 412 can execute a subframe configuration ("SFCFG") instruction to update a third set of configuration parameters.

At block 718, a determination is made as to whether the entry is a time control instruction. For example, the controller 412 determines if the current entry in the job description list is a time control instruction. In an exemplary embodiment, a time control instruction configured as a "done" instruction is not detected. If the current entry is a time control instruction, the method proceeds to block 710. If the current entry is not a time control instruction, the method proceeds to block 720.

At block 710, a time control function is performed. For example, in an exemplary embodiment, the controller 412 executes the time control instruction to wait for the appropriate system time (or count) to occur. For example, the time control entry is used by the controller 412 to synchronize configuration of the uplink 400 as illustrated by the timing diagram shown in FIG. 5. For example, the timing control function can be used to synchronize the processing functions of the receive chains 414 and 416. In an exemplary embodiment, the time control instruction is configured as shown in Table 3 and described in other sections of this description.

At block 720, a determination is made as to whether the entry is a subframe configuration instruction. For example, the controller 412 determines if the current entry in the job description list is a subframe configuration instruction. If the current entry is a subframe configuration instruction, the method proceeds to block 712. If the current entry is not a subframe configuration instruction, the method proceeds to block 722.

At block 712, a sub-frame configuration function is performed. For example, in an exemplary embodiment, the controller 412 executes the subframe configuration instruction to configure the appropriate processing blocks for the current subframe. In an exemplary embodiment, the subframe configuration instruction is configured as shown above with respect to Table 1 and described in other sections of this description.

At block 722, a determination is made as to whether the entry is a per symbol instruction. For example, the controller 412 determines if the current entry in the job description list is a per symbol configuration instruction. If the current entry is a per symbol configuration instruction, the method proceeds to block 714. If the current entry is not a per symbol configuration instruction, the method proceeds to block 724.

At block 714, a per symbol configuration function is performed. For example, in an exemplary embodiment, the controller 412 executes the per symbol configuration instruction to configure the appropriate processing blocks for the current symbol. In an exemplary embodiment, the per symbol configuration instruction is configured as shown above with respect to Table 1 and described in other sections of this description.

At block 724, a determination is made as to whether the entry is a semi static parameter instruction. For example, the controller 412 determines if the current entry in the job description list is a semi static parameter configuration instruction. If the current entry is a semi static parameter configuration instruction, the method proceeds to block 716. If the current entry is not a semi static parameter configuration instruction, the method proceeds to block 726.

At block 716, a semi-static parameter configuration function is performed. For example, in an exemplary embodiment, the controller 412 executes the semi-static parameter configuration instruction to configure the appropriate processing blocks. In an exemplary embodiment, the semi-static parameter configuration instruction is configured as shown above with respect to Table 1 and described in other sections of this description.

At block 726, a determination is made as to whether the entry is a done instruction. For example, the controller 412 determines if the current entry in the job description list is a done instruction. For example, the done instructions is a WTICK instruction with the appropriate parameters set. If the current entry is a done instruction, the method proceeds to end. If the current entry is not a done instruction, the method proceeds to block 728.

At block 728, the next entry in the job description list is pointed to. For example, the controller 412 points to the next instruction in the buffer 410 and the method proceeds to block 708.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. An apparatus for facilitating network communication, comprising:
    a first sector configured to transmit first information received from a first user equipment via first radio frequency (RF) signals;
    a second sector, coupled to the first sector, configured to receive second information for transmitting to a second user equipment via second RF signals; and
    a front-end accelerator block (FEAB) coupled to the first sector and configured to include a downlink front end (DLFE) and an uplink front end (ULFE), wherein the ULFE, operable to receive the first RF signals, is able to receive and process the first information in response to a job description list utilized to configure at least one configurable functional block (CFB) of a transceiver in the ULFE, wherein the ULFE includes functional blocks for generating a second receive chain which is utilized to generate data and demodulation reference signals (DMRS) symbols in response to the first RF signals.

2. The apparatus of claim 1, wherein the DLFE, coupling to the second sector, is configured to transmit the second information via the second RF signals in response to the job description list utilized for programming at least one CFB of a transceiver in the DLFE.

3. The apparatus of claim 1, wherein the ULFE includes a memory configured to store a job description list containing a first set of instructions for configuring a receiver to process the first RF signals.

4. The apparatus of claim 1, wherein the DLFE includes a memory configured to store a job description list containing a second set of instructions for configuring a transceiver to process the second RF signals.

5. The apparatus of claim 3, wherein the job description list contains information relating to sampling multiple radio frequencies from multiple sectors according to radio frame ticks from received radio signals.

6. The apparatus of claim 1, wherein the ULFE includes a controller operable to program one or more CFBs of the transceiver to process the first RF signals based on a first set of instructions of the job description list.

7. The apparatus of claim 6, wherein the one or more CFBs of the transceiver are synchronized according to the first set of instructions of the job description list.

8. The apparatus of claim 7,
    wherein the one or more CFBs of the transceiver are configurable to process radio signals originated from one or more sectors; and
    wherein each sector has an associated configuration.

9. The apparatus of claim 7, wherein the first set of instructions of the job description list include one or more instructions selected from a set of a semi-static parameter update (SSPUP) instruction, a subframe configuration (SFCFG) instruction, a per-sector-per-symbol-task (PSTSK) instruction, a time control (WTICK) instruction, and a dummy thread (DTHRD) instruction.

10. The apparatus of claim 9, wherein the controller decodes the SSPUP instruction to update semi-static parameters that are used to process multiple subframes.

11. The apparatus of claim 9, wherein the controller decodes the SFCFG instruction to update processing functions to process one subframe according to subframe parameters.

12. The apparatus of claim 9, wherein the controller decodes the PSTSK instruction to update processing functions to process one symbol in a specified sector.

13. The apparatus of claim 9, wherein the controller decodes the WTICK instruction to synchronize a selected processing function with a system time.

14. The apparatus of claim 1, wherein the DLFE is configured to process downlink functions based on one or more instructions in the job description list.

15. A method for facilitating network communication, comprising:

receiving first radio signals having a first radio frequency from a first sector via a wireless communication network;

providing configuration parameters in accordance with a job description list and system timing signals;

forwarding the configuration parameters from a controller to multiple functional blocks of an uplink front end (ULFE) for programming at least a portion of the functional blocks situated in a first receive chain of the ULFE;

generating demodulation reference signals (DMRS) symbols by the first receive chain in response to the first radio signals;

forwarding the configuration parameters to multiple functional blocks of the ULFE to program at least a portion of functional blocks for providing a second receive chain in the ULFE; and generating data and DMRS symbols via the second receive chain in response to the first radio signals.

16. The method of claim 15, further comprising fetching the job description list from a local buffer.

17. The method of claim 15, further comprising identifying radio frame ticks of the first radio signals.

18. The method of claim 17, further comprising identifying a first set of instructions from the job description list containing information relating to sampling multiple sectors in a job description buffer of the ULFE based on the radio frame ticks.

19. The method of claim 15, further comprising configuring one or more processing functions of a transceiver in the ULFE in response to a first set of instructions for processing the first radio signal.

20. The method of claim 19, wherein the configuring one or more processing functions include synchronizing timing according to time control instructions in the job description list and the first set of instructions for processing the first radio signal.

21. The method of claim 19, wherein the forwarding the configuration parameters includes one or more instructions selected from a set comprising a semi-static parameter update (SSPUP) instruction, a subframe configuration ("SFCFG") instruction, a per-sector-per-symbol-task ("PSTSK") instruction, a time control (WTICK) instruction, and a dummy thread (DTHRD) instruction.

22. The method of claim 15, further comprising:
obtaining data to be transmitted through second radio signals having a second radio frequency to a second sector via a wireless communication network; and
providing configuration parameters in accordance with a job description list and system timing signals.

23. The method of claim 22, further comprising forwarding the configuration parameters from a controller to multiple functional blocks of a downlink front end (DLFE) to program at least a portion of the functional blocks in a transmission receive chain within the DLFE.

24. The method of claim 22, further comprising transmitting radio frame samples containing the data to one or more antennas in the second sector via a common public radio interface (CPRI) functional block.

25. A method for facilitating network communication, comprising:

obtaining data to be transmitted through first radio signals represented by a first radio frequency to one or more antennas within a first sector via a wireless network;

providing configuration parameters in accordance with a job description list and system timing signals;

forwarding the configuration parameters from a controller to multiple functional blocks of a downlink front end (DLFE) for configuring at least a portion of the functional blocks in a transmission receive chain of the DLFE;

transmitting radio frame samples containing the data to one or more antennas in the first sector via a common public radio interface (CPRI) functional block;

programming at least a portion of multiple functional blocks of an uplink front end (ULFE) for providing a second transmission receive chain in accordance with the configuration parameters; and generating data and DMRS symbols via the second transmission receive chain in response to the first radio signals.

26. The method of claim 25, further comprising:
receiving second radio signals having a second radio frequency from a second sector from a wireless communication network; and
providing configuration parameters in accordance with a job description list and system timing signals.

27. The method of claim 26, further comprising forwarding the configuration parameters from a controller to multiple functional blocks of an uplink front end (ULFE) to program at least a portion of the functional blocks in a receive chain.

28. The method of claim 27, further comprising generating demodulation reference signals (DMRS) symbols via a first receive chain in response to the first radio signals.

29. An apparatus for facilitating network communication, comprising:
means for receiving first radio signals having a first radio frequency from a first sector via a wireless communication network;
means for providing configuration parameters in accordance with a job description list and system timing signals;
means for forwarding the configuration parameters from a controller to multiple functional blocks of an uplink front end (ULFE) for programming at least a portion of the functional blocks in a first receive chain of the ULFE;
means for generating demodulation reference signals (DMRS) symbols via the first receive chain in response to the first radio signals;
means for forwarding the configuration parameters from a controller to multiple functional blocks of the ULFE to program at least a portion of the functional blocks in a second receive chain; and
means for generating data and DMRS symbols via the second receive chain in response to the first radio signals.

30. The apparatus of claim 29, further comprising means for fetching the job description list from a buffer.

31. The apparatus of claim 29, further comprising means for identifying radio frame ticks of the first radio signals.

* * * * *